United States Patent
Sugiura et al.

(10) Patent No.: US 7,018,733 B2
(45) Date of Patent: Mar. 28, 2006

(54) FUEL CELL STACK HAVING COOLANT FLOWING ALONG EACH SURFACE OF A COOLING PLATE

(75) Inventors: Seiji Sugiura, Utsunomiya (JP); Masaharu Suzuki, Utsunomiya (JP); Tetsuya Koido, Utsunomiya (JP); Yoshinori Wariishi, Utsunomiya (JP); Yosuke Fujii, Kawachi-gun (JP); Takaki Nakagawa, Utsunomiya (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 383 days.

(21) Appl. No.: 10/267,773

(22) Filed: Oct. 9, 2002

(65) Prior Publication Data

US 2003/0068541 A1    Apr. 10, 2003

(30) Foreign Application Priority Data

Oct. 9, 2001 (JP) .............................. 2001-311603

(51) Int. Cl.
*H01M 8/02* (2006.01)
(52) U.S. Cl. .......................................... 429/26; 429/38
(58) Field of Classification Search ................. 429/26, 429/34, 37–39
See application file for complete search history.

(56) References Cited

U.S. PATENT DOCUMENTS 5,736,269 A  *  4/1998  Okamoto et al. ............. 429/32
6,344,289 B1 *  2/2002  Dekker et al. ................ 429/17

FOREIGN PATENT DOCUMENTS

JP           05190193 A  *  7/1993

* cited by examiner

*Primary Examiner*—Gregg Cantelmo
(74) *Attorney, Agent, or Firm*—Lahive & Cockfield, LLP; Anthony A. Laurentano, Esq (57) ABSTRACT

A unit cell has a membrane electrode assembly. The membrane electrode assembly includes a cathode, and an anode, and a solid polymer electrolyte fuel cell interposed between the cathode and the anode. The membrane electrode assembly is interposed between a first separator and a second separator. A thin cooling plate is interposed between the second separator and another first separator. A first coolant flow passage and a second coolant flow passage are formed on both surfaces of the cooling plate. The coolant flows along one surface of the cooling plate, and turns back at an end of the cooling plate to flow along the other surface of the cooling plate.

5 Claims, 12 Drawing Sheets

FUEL CELL STACK HAVING COOLANT FLOWING ALONG EACH SURFACE OF A COOLING PLATE

BACKGROUND OF THE INVENTION

1. Field of the Invention

The present invention relates to a fuel cell stack having an assembly including an anode, and a cathode, and an electrolyte interposed between the anode and the cathode. A plurality of the assemblies and separators are alternately stacked to form the fuel cell stack.

2. Description of the Related Art

For example, a solid polymer electrolyte fuel employs a membrane electrode assembly (MEA) which includes two electrodes (anode and cathode) and an electrolyte membrane interposed between the electrodes. The electrolyte membrane is a polymer ion exchange membrane (proton exchange membrane). Each of the electrodes includes a catalyst and a porous carbon sheet. The membrane electrode assembly is interposed between separators (bipolar plates). The membrane electrode assembly and the separators make up a unit of the fuel cell (unit cell) for generating electricity. A plurality of unit cells are connected together to form a fuel cell stack.

In the fuel cell of the fuel cell stack, a fuel gas such as a hydrogen-containing gas is supplied to the anode. The catalyst of the anode induces a chemical reaction of the fuel gas to split the hydrogen molecule into hydrogen ions (protons) and electrons. The hydrogen ions move toward the cathode through the electrolyte, and the electrons flow through an external circuit to the cathode, creating a DC electric current. An oxygen-containing gas or air is supplied to the cathode. At the cathode, the hydrogen ions from the anode combine with the electrons and oxygen to produce water.

In the fuel cell stack, if the ion exchange membrane is used at a high temperature, the ion exchange membrane may be damaged. Therefore, it is necessary to suitably cool the ion exchange membrane. Therefore, coolant flow passages are provided between unit cells, for example, between separators along surfaces of the membrane electrode assembly. Further, a coolant supply passage and a coolant discharge passage connected to the coolant flow passages extend through the separators in the stacking direction of the fuel cell stack. The coolant supply passage and the coolant discharge passage may be provided outside the separators.

A fuel gas flow passage for supplying the fuel gas, and an oxygen-containing gas flow passage for supplying the oxygen-containing gas are provided on the surfaces of the separators. The fuel gas flow passage and the oxygen-containing gas flow passage are cooled equally by the coolant flowing through the coolant flow passages. In the oxygen-containing gas flow passage, water vapor produced in the electrochemical reaction may condense into water undesirably. Therefore, the power generation performance may be lowered due to the concentration overpotential.

SUMMARY OF THE INVENTION

A principle object of the present invention is to provide a fuel cell stack having a simple structure and an excellent power generation performance.

According to the present invention, a plurality of membrane electrode assemblies and separators are alternately stacked to form a fuel cell stack. A cooling plate is provided adjacent to a certain separator. Coolant flow passages are formed on both surfaces of the cooling plate. A coolant flows along one surface facing the anode, and turns back to flow along the other surface facing the cathode.

Firstly, the coolant cools the anode. After the temperature of the coolant increases, the coolant cools the cathode. Therefore, the temperature of the oxygen-containing gas flow passage for supplying the oxygen-containing gas to the cathode is kept higher than the temperature of the fuel gas flow passage for supplying the fuel gas to the anode. Thus, condensation of water vapor in the oxygen-containing gas flow passage does not occur. Since concentration overpotential is decreased, it is possible to improve the power generation performance.

Further, the cooling plate has a thermal insulation mechanism for preventing heat exchange between the coolant flowing along one surface of the cooling plate and the coolant flowing the other surface of the cooling plate. Since the heat exchange is prevented, a desired temperature distribution in the membrane electrode assembly is maintained. Further, the humidity distribution does not change significantly in the fuel gas flow passage and in the oxygen-containing gas flow passage. As a result, the current density is uniform in the overall fuel cell stack. Therefore, it is possible to decrease concentration overpotential and resistance overpotential.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
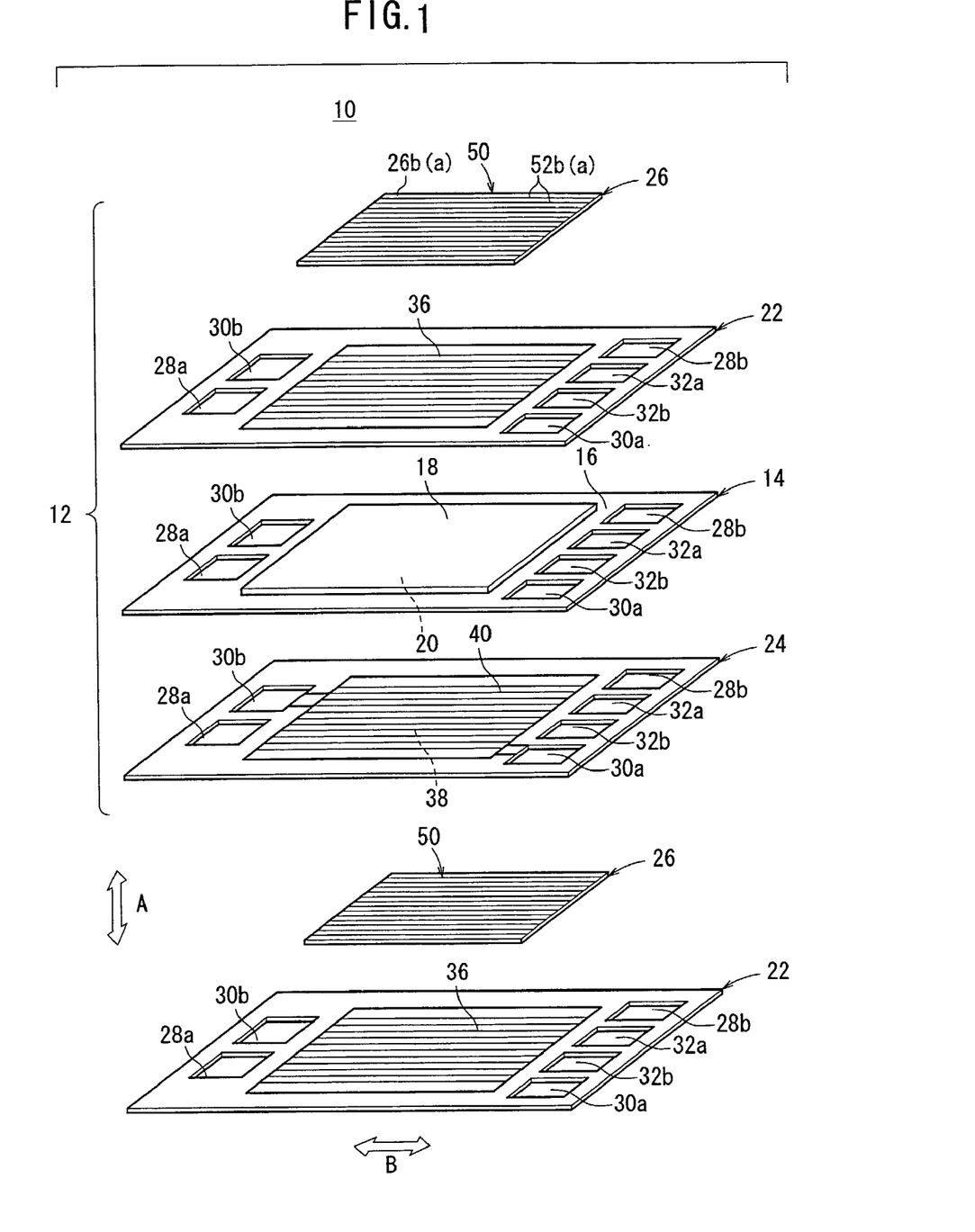
FIG. 1 is an exploded perspective view showing main components of a fuel cell stack according to a first embodiment of the present invention.
Figure 2:
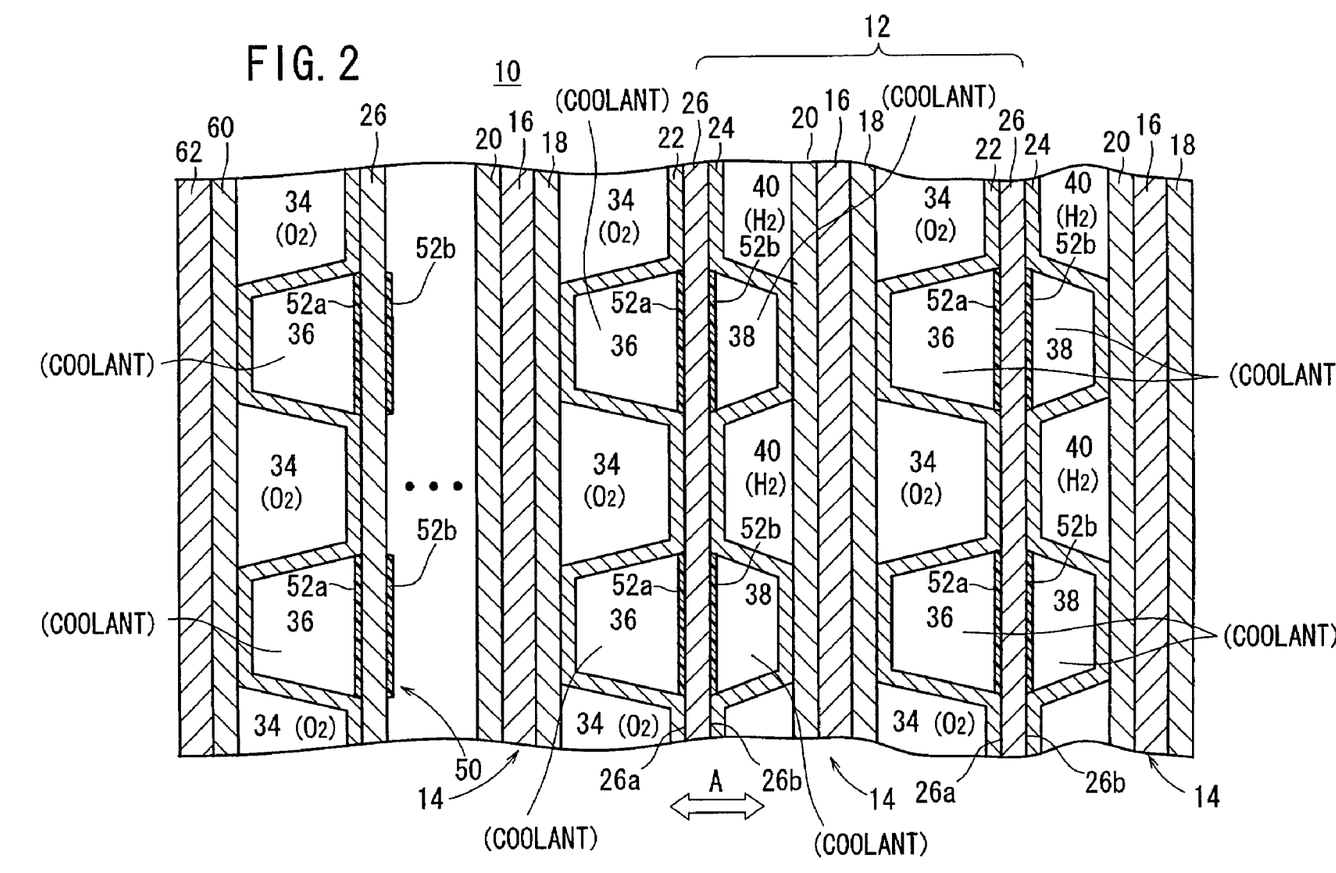
FIG. 2 is a cross sectional view showing a part of the fuel cell stack.

FIG. 1 is an exploded schematic view showing main components of a unit of a fuel cell (unit cell) 12 in a fuel cell stack 10 according to a first embodiment of the present invention. FIG. 2 is a cross sectional view showing a part of the fuel cell stack formed by stacking a plurality of the unit cells 12.

As shown in FIG. 1, the unit cell 12 has a membrane electrode assembly 14. The membrane electrode assembly 14 includes a cathode 18, an anode 20, and a solid polymer electrolyte membrane (electrolyte) 16 interposed between the cathode 18 and the anode 20. Each of the cathode 18, and the anode 20 includes an electrode catalyst and a porous carbon sheet.

As shown in FIGS. 1 and 2, a first separator 22 is provided on the cathode 18 of the electrolyte membrane assembly 14, and a second separator 24 is provided on the anode 20 of the electrolyte membrane assembly 14. A thin cooling plate 26 is interposed between adjacent unit cells 12, i.e., between the first separator 22 of the unit cell 12 and the second separator 24 of another unit cell 12. The cooling plate 26 is made of conductive metal or conductive carbon.

As shown in FIG. 1, each of the membrane electrode assembly 14, the first separator 22, and the second separator 24 has two holes at one longitudinal end in a direction indicated by an arrow B. When the membrane electrode assembly 14, the first separator 22, and the second separator 24 are stacked in a direction indicated by an arrow A, these holes form an oxygen-containing gas supply passage 28a, and a fuel gas discharge passage 30b.

Further, each of the membrane electrode assembly 14, the first separator 22, and the second separator 24 has four holes at the other longitudinal end in the direction indicated by the arrow B. When the membrane electrode assembly 14, the first separator 22, and the second separator 24 are stacked in the direction indicated by the arrow A, these holes form an oxygen-containing gas discharge passage 28b, a fuel gas supply passage 30a, a coolant supply passage 32a, and a coolant discharge passage 32b.

An oxygen-containing gas (reactant gas) such as an air is supplied to the unit cells 12 through the oxygen-containing gas supply passage 28a, and discharged from the unit cells 12 through the oxygen-containing gas discharge passage 28b. A fuel gas (reactant gas) such as a hydrogen-containing gas is supplied to the unit cells 12 through the fuel gas supply passage 30a, and discharged from the unit cells 12 through the fuel gas discharge passage 30b. Further, a coolant is supplied to the unit cells 12 through the coolant supply passage 32a, and discharged from the unit cells 12 through the coolant discharge passage 32b.

Figure 3:
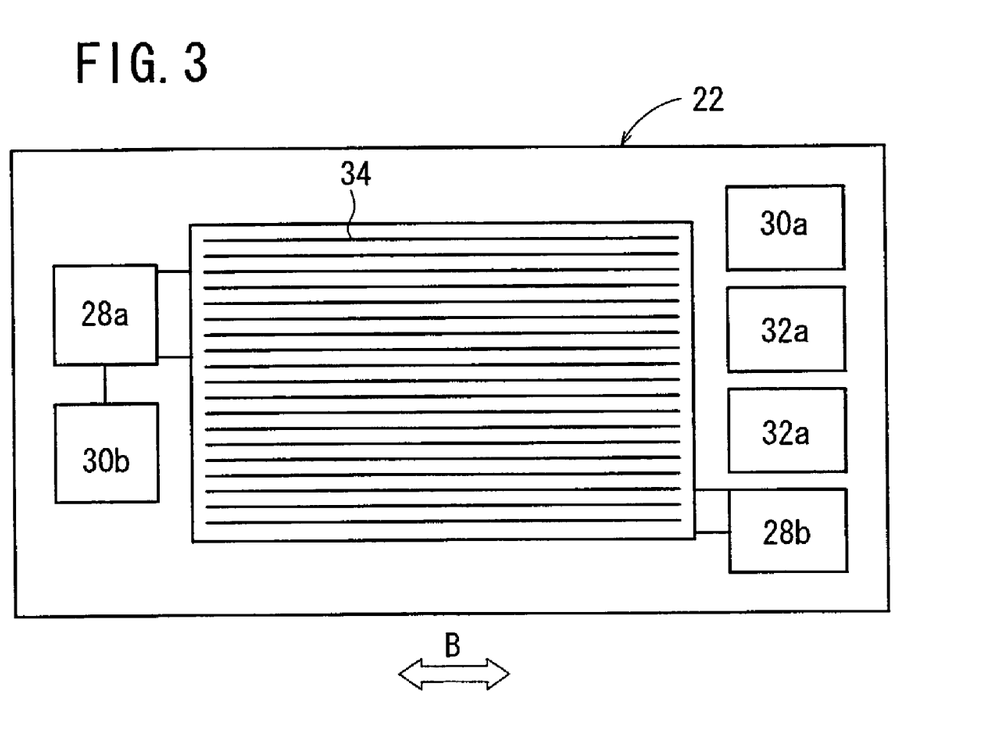
FIG. 3 is a front view showing a first separator of the fuel cell stack.

The first separator 22 is a thin metal plate having a rough surface (e.g., corrugated surface) corresponding to a reaction surface (power generation surface) of the electrolyte membrane assembly 14. As shown in FIGS. 2 and 3, the first separator 22 has an oxygen-containing gas flow passage (reactant gas flow passage) 34 comprising a plurality of grooves on its surface facing the cathode 18 of the membrane electrode assembly 14. The oxygen-containing gas flow passage 34 extends in the longitudinal direction indicated by the arrow B. The oxygen-containing gas flow passage 34 is connected the oxygen-containing gas supply passage 28a at one end, and connected to the oxygen-containing gas discharge passage 28b at the other end.

As shown in FIGS. 1 and 2, the first separator 22 has a first coolant flow passage 36 comprising a plurality of grooves on its surface facing one surface 26a of the cooling plate 26. The second separator 24 has a second coolant flow passage 38 comprising a plurality of grooves on its surface facing the other surface 26b of the cooling plate 26. Stated otherwise, the first coolant flow passage 36 is formed on one surface 26a of the cooling plate 26, and the second coolant flow passage 38 is formed on the other surface 26b of the cooling plate 26.

The first coolant flow passage 36 and the second coolant flow passage 38 extend in the longitudinal direction indicated by the arrow B. The first coolant flow passage 36 is connected to the coolant discharge passage 32b at one end, and connected to the second coolant flow passage 38 at the other end. Specifically, the first coolant flow passage 36 and the second coolant flow passage 38 are connected at an end of the cooling plate 26. The second coolant flow passage 38 is connected to the coolant supply passage 32a.

The second separator 24 has substantially the same structure as the first separator 22. However, the second separator 24 has a fuel gas flow passage (reactant gas flow passage) 40 on its surface facing the anode 20 of the membrane electrode assembly 14. The fuel gas flow passage 40 extends in the longitudinal direction indicated by the arrow B. The fuel gas flow passage 40 is connected to the fuel gas supply passage 30a at one end, and connected to the fuel gas discharge passage 30b at the other end.

As shown in FIG. 2, the cooling plate 26 includes a thermal insulation mechanism 50. The thermal insulation mechanism 50 prevents heat exchange between the coolant flowing through the first coolant flow passage 36 on the surface 26a, and the coolant flowing through the second coolant flow passage 38 on the surface 26b. The heat insulation mechanism 50 includes thermal insulation layers 52a, 52b. The thermal insulation layers 52a, 52b are formed by coating a rubber, or a resin material such as polytetrafluoroethylene (PTFE) on the surfaces 26a, 26b of the cooling plate 26.

The thermal insulation layer 52a is formed in the first coolant flow passage 36 of the first separator 22. The thermal insulation layer 52a is not formed on the contact surface between the first separator 22 and the surface 26a of the cooling plate 26. Therefore, the first separator 22 and the cooling plate 26 are electrically connected. Similarly, the thermal insulation layer 52b is formed in the second coolant flow passage 38 of the second separator 24. The thermal insulation layer 52b is not formed on the contact surface between the second separator 24 and the surface 26b of the cooling plate 26. Therefore, the second separator 24 and the cooling plate 26 are electrically connected.

As shown in FIG. 2, the unit cells 12 are stacked in the direction indicated by the arrow A. Terminal plates 60 are stacked on the outermost unit cells 12. End plates 62 are stacked on the outside of the terminal plates 60. The end plates 62 are tightened together by tie rods (not shown) or the like to form the fuel cells stack 10.

An operation of the fuel cell stack 10 will be described below.

In the fuel cell stack 10, a fuel gas such as a hydrogen-containing gas, an oxygen-containing gas such as air, a coolant such as pure water, an ethylene glycol or an oil are supplied to each of the unit cells 12 stacked together in the direction indicated by the arrow A.

Figure 4:
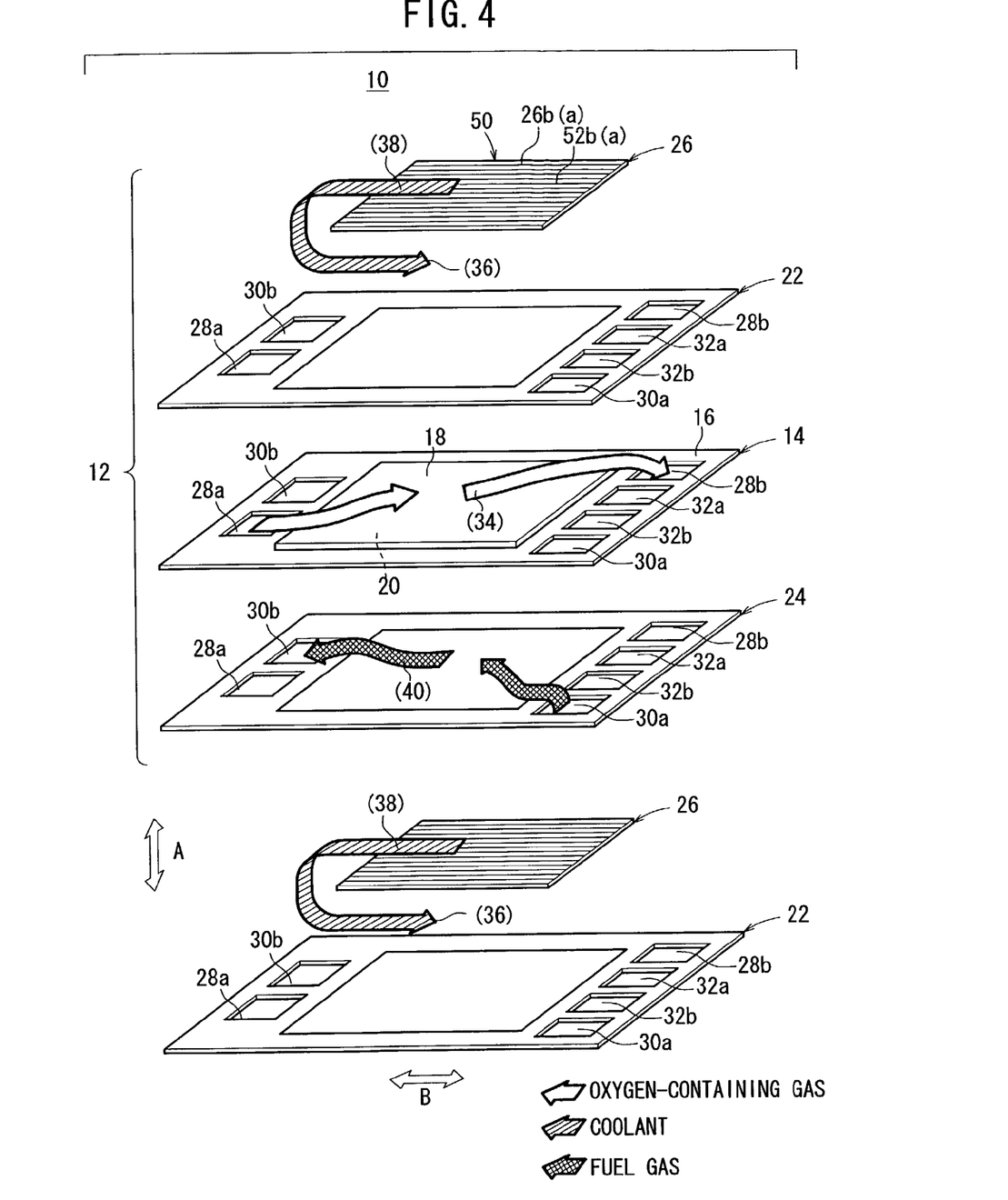
FIG. 4 is an exploded perspective view showing flows of fluids in the fuel cell stack.

As shown in FIG. 4, the oxygen-containing gas flows through the oxygen-containing gas supply passage 28a, and flows into the grooves of the oxygen-containing gas flow passage 34 formed on the first separator 22. The oxygen-containing gas in the oxygen-containing gas flow passage 34 flows along the cathode 18 of the membrane electrode assembly 14 to induce a chemical reaction at the cathode 18. Then, the oxygen-containing gas flows into the oxygen-containing gas discharge passage 28b. The fuel gas flows through the fuel gas supply passage 30a, and flows into the grooves of the fuel gas flow passage 40 formed on the second separator 24. The fuel gas in the fuel gas flow passage 40 flows along the anode 20 of the membrane electrode assembly 14 to induce a chemical reaction at the anode 20. Then, the fuel gas flows into the fuel gas discharge passage 30b.

In the membrane electrode assembly 14, the oxygen-containing gas supplied to the cathode 18, and the fuel gas supplied to the anode 20 are consumed in the electrochemical reactions at catalyst layers of the cathode 18 and the anode 20 for generating electricity.

The coolant flows through the coolant supply passage 32a, and flows into the second coolant flow passage 38 of the second separator 24. The coolant turns back at a turning point, i.e., at the end of the cooling plate 26, and flows through the first coolant flow passage 36 of the first separator 22. Then, the coolant flows into the coolant discharge passage 32b. In this manner, the membrane electrode assembly 14 is cooled by the coolant.

In the first embodiment, as shown in FIG. 4, the coolant flows through the second coolant flow passage 38 for cooling the fuel gas flowing through the fuel gas flow passage 40. Therefore, the temperature of the coolant increases when the coolant flows through the second coolant flow passage 38. After the temperature of the coolant increases, the coolant flows back at the end of the cooling plate 26, and flows through the first coolant flow passage 36 for cooling the oxygen-containing gas flowing through the oxygen-containing gas flow passage 34 of the first separator 22.

As described above, firstly, the coolant cools the fuel gas. After the temperature of the coolant increases, the coolant cools the oxygen-containing gas. Therefore, the oxygen-containing gas flow passage 34 for supplying the oxygen-containing gas to the cathode 18 is kept at a high temperature in comparison with the fuel gas flow passage 40 for supplying the fuel gas to the anode 20.

Thus, it is possible to prevent condensation of water vapor produced by the electrochemical reaction in the oxygen-containing gas flow passage 34. It is possible to effectively decrease concentration overpotential, and improve power generation performance in the unit cells 12.

In the first embodiment, the cooling plate 26 has the thermal insulation mechanism 50 including the thermal insulation layer 52a and the thermal insulation layer 52b. The heat insulation layer 52a is formed in the first coolant flow passage 36 on the surface 26a of the cooling plate 26. The heat insulation layer 52b is formed in the second coolant flow passage 38 on the surface 26b of the cooling plate 26. Therefore, the heat exchange between the coolant flowing along the surface 26a, and the coolant flowing along the surface 26b is effectively prevented. The temperature distribution in the membrane electrode assembly 14 is maintained desirably by the coolant flowing along the surface 26a of the cooling plate 26 and the coolant flowing along the surface 26b of the cooling plate 26.

Figure 5:
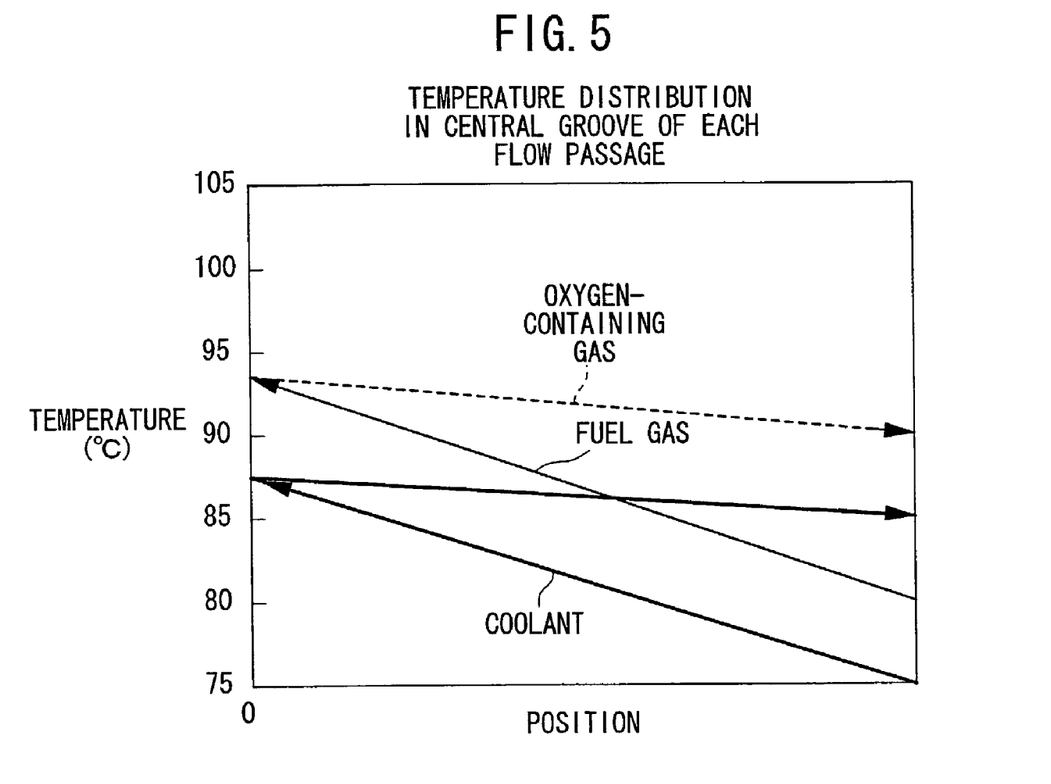
FIG. 5 is a view showing temperature distribution in central parts of passages in which no thermal insulation mechanism is used.

Temperature distribution of the membrane electrode assembly 14 having no thermal insulation mechanism 50 on the cooling plate 26 is measured. FIG. 5 shows the temperature distribution in central grooves of the oxygen-containing gas flow passage 34, the fuel gas flow passage 40, and the first and second coolant flow passages 36, 38.

In FIG. 5, "POSITION" indicates a position of a power generation surface of the membrane electrode assembly 14. "0" position indicates the turning point connecting the first coolant flow passage 36 and the second coolant flow passage 38. The oxygen-containing gas, the fuel gas, and the coolant flow along the power generation surface in directions indicated by arrows.

If the cooling plate 26 is thin, heat exchange is performed significantly between the coolant flowing through the first coolant flow passage 36 on one surface 26a of the cooling plate 26, and the coolant flowing through the second coolant flow passage 38 on the other surface 26b of the cooling plate. Therefore, the temperature of the cooling plate 26 is considerably high at the end, i.e., the turning point of the cooling plate 26. The temperature of the fuel gas is relatively high at a position near the fuel gas discharge passage 30b, and the temperature of the oxygen-containing gas is relatively high at a position near the oxygen-containing gas supply passage 28a. Thus, the solid polymer electrolyte membrane 16 of the membrane electrode assembly 14 is likely to be damaged by the high temperature.

The temperature of the oxygen-containing gas gets lower as the oxygen-containing gas flows from the oxygen-containing gas supply passage 28a toward the oxygen-containing gas discharge passage 28b. Water vapor is produced by the electrochemical reaction in the oxygen-containing gas flow passage 34. Since the oxygen-containing gas is cooled when it flows toward the oxygen-containing gas discharge passage 28b, the water vapor in the oxygen-containing gas may condense into liquid water undesirably.

Figure 6:
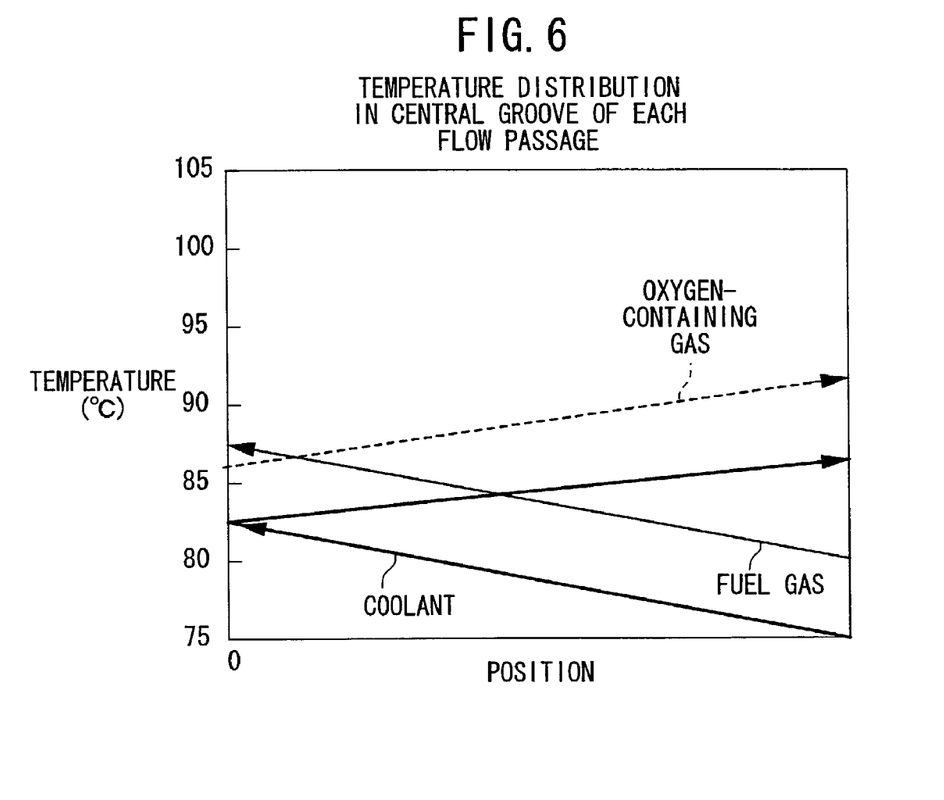
FIG. 6 is a view showing temperature distribution in central parts of passages in which a thermal insulation mechanism is used.

Further, temperature distribution of the membrane electrode assembly 14 having the thermal insulation mechanism 50 on the cooling plate 26 is measured. FIG. 6 shows the temperature distribution in central grooves of the oxygen-containing gas flow passage 34, the fuel gas flow passage 40, and the first and second coolant flow passages 36, 38.

Heat exchange between the coolant flowing along the surface 26a of the cooling plate 26 and the coolant flowing along the other surface 26b of the cooling plate 26 is effectively prevented. Therefore, the temperature of the coolant is not excessively high at the end (turning point) of the cooling plate 26. Thus, it is possible to effectively cool the fuel gas and the oxygen-containing gas, and improve the durability of the solid polymer electrolyte membrane 16. The temperature of the oxygen-containing gas gets higher as the oxygen-containing gas flows from the oxygen-containing gas supply passage 28a toward the oxygen-containing gas discharge passage 28b. Therefore, the water vapor in the oxygen-containing gas does not condense in the oxygen-containing gas flow passage 34.

Figure 7:
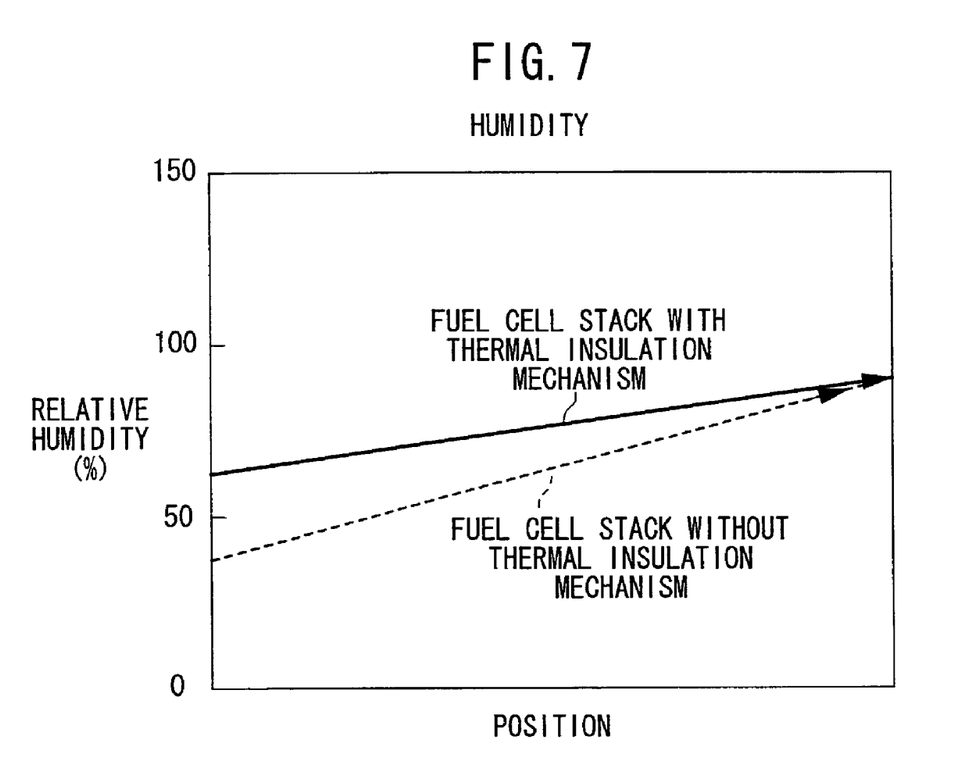
FIG. 7 is a view showing a relative humidity of a fuel stack having the thermal insulation mechanism, and a relative humidity of a fuel cell stack having no thermal insulation mechanism.

Further, as shown in FIG. 7, in the fuel cell stack 10 with the thermal insulation mechanism 50, the change of the relative humidity in the oxygen containing gas is suppressed. Therefore, the desired power generation performance of the unit cells 12 is maintained. In the solid polymer electrolyte membrane 16, the membrane resistance does not increase since the relative humidity is maintained at a desired level.

As shown in FIG. 2, the cooling plates 26 each having the thermal insulation mechanism 50 are provided closely to the end plates 62 and the terminal plates 60 at the opposite ends in the stacking direction of the fuel cell stack 10. Therefore, heat radiation to the outside (the external air) from the unit cells 12 is suppressed. The temperature of the unit cells 12 is kept uniform in the stacking direction of the fuel cell stack 10.

Figure 8:
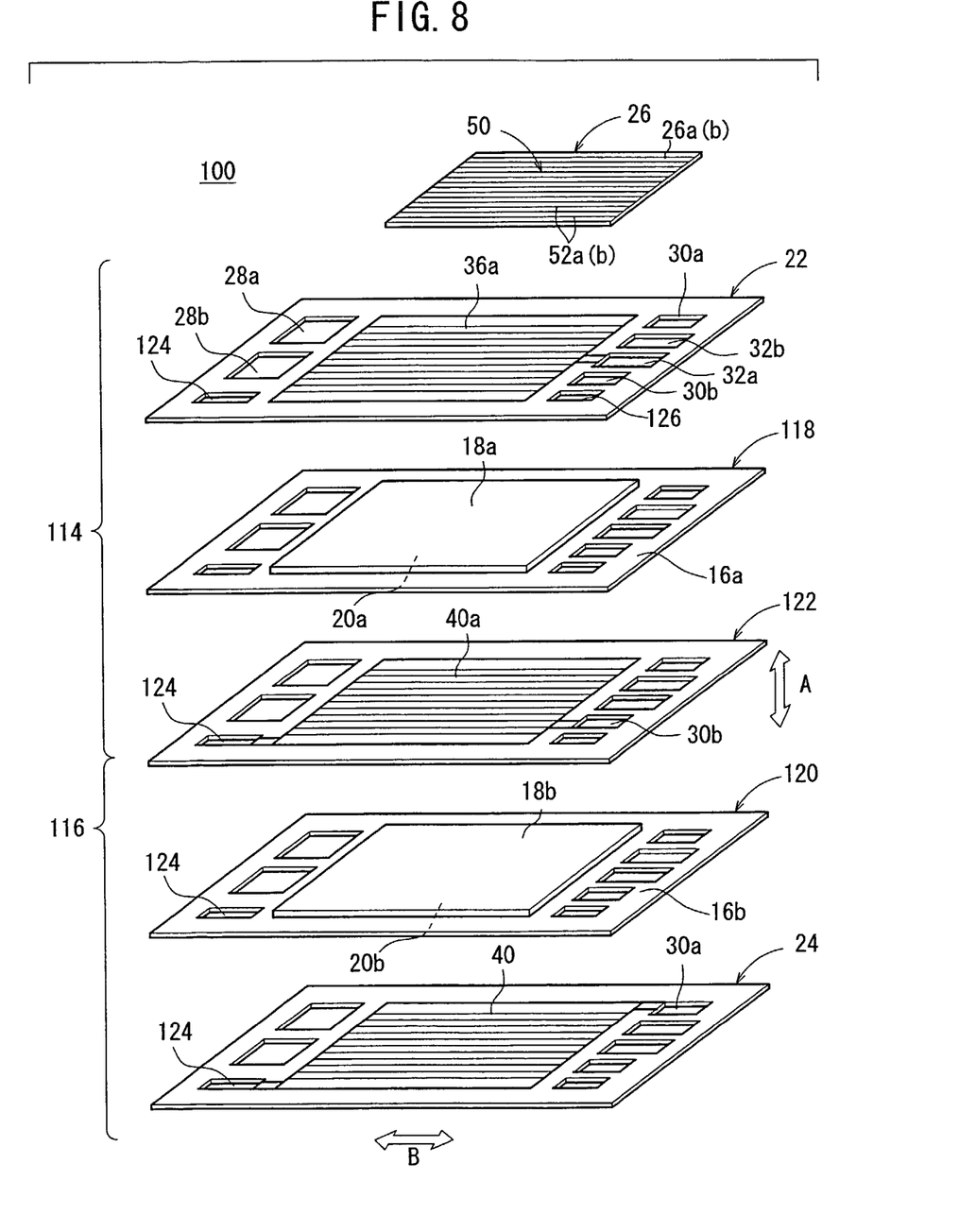
FIG. 8 is an exploded perspective view showing main components of a fuel cell stack according to a second embodiment of the present invention.
Figure 9:
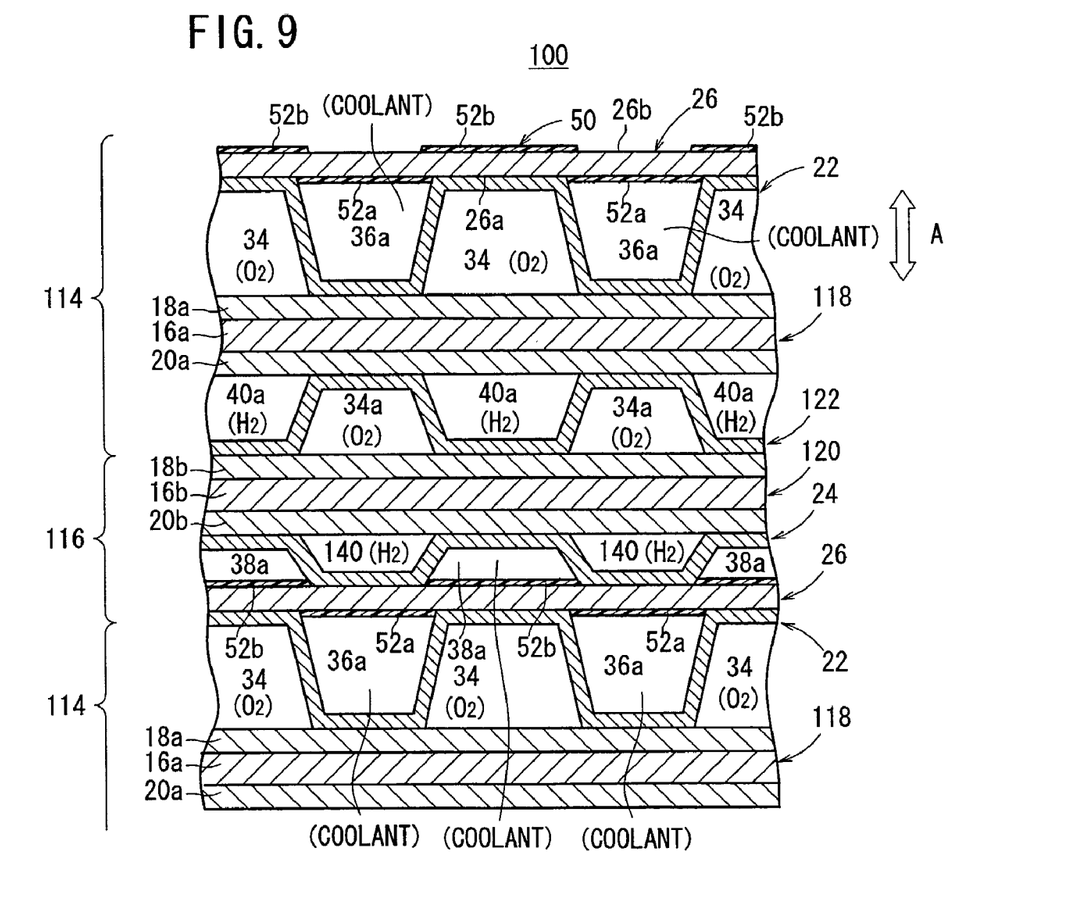
FIG. 9 is a cross sectional view showing a part of the fuel cell stack.

FIG. 8 is an exploded perspective view showing main components of a fuel cell stack 100 according to a second embodiment of the present invention. FIG. 9 is a cross sectional view showing a part of the fuel cell stack 100. The constituent elements of the fuel cell stack 100 that are identical to those of the fuel cell stack 10 are labeled with the same reference numeral, and description thereof is omitted.

As shown in FIG. 8, in the fuel cell stack 100, a first unit of a fuel cell (first unit cell) 114 and a second unit of a fuel cell (second unit cell) 116 are stacked together in a direction indicated by an arrow A. The first unit cell 114 has a first membrane electrode assembly 118, and the second unit cell 116 has a second membrane electrode assembly 120.

The first membrane electrode assembly 118 includes a cathode 18a, an anode 20a, and a solid polymer electrolyte membrane 16a interposed between the cathode 18a and the anode 20a. The second membrane electrode assembly 120 includes a cathode 18b, an anode 20b, and a solid polymer electrolyte membrane 16b interposed between the cathode 18b and the anode 18b. Each of the cathodes 18a, 18b, and the anodes 20a, 20b includes an electrode catalyst and a porous carbon sheet.

As shown in FIGS. 8 and 9, a first separator 22 is provided on the cathode 18a of the first membrane electrode assembly 118, and a second separator 24 is provided on the anode 20b of the second membrane electrode assembly 120. Further, an intermediate separator 122 is provided between the first membrane electrode assembly 118 and the second membrane electrode assembly 120.

As shown in FIG. 8, in the first and second unit cells 114, 116, each of the first and second membrane electrode assemblies 118, 120, the first separator 22, the second separator 24, and the intermediate separator 122 has three holes at one longitudinal end in a direction indicated by an arrow B. When the first and second membrane electrode assemblies 118, 120, the first separator 22, the second separator 24, and the intermediate separator 122 are stacked in the direction indicated by the arrow A, these holes form an oxygen-containing gas supply passage 28a, and an oxygen-containing gas discharge passage 28b, and a fuel gas passage 124. The fuel gas is supplied to the second unit cell 116 for inducing a chemical reaction in the second unit cell 116. Then, the fuel gas is supplied to the first unit cell 114 through the fuel gas passage 124.

In the first and second unit cells 114, 116, each of the first and second membrane electrode assemblies 118, 120, the first separator 22, the second separator 24, and the intermediate separator 122 has five holes at the other longitudinal end in the direction indicated by the arrow B. When the first and second membrane electrode assemblies 118, 120, the first separator 22, the second separator 24, and the intermediate separator 122, are stacked in the direction indicated by the arrow A, these holes form an oxygen-containing gas passage 126, a fuel gas supply passage 30a, a fuel gas discharge passage 30b, a coolant supply passage 32a, and a coolant discharge passage 32b. The oxygen-containing gas is supplied to the first unit cell 114 for inducing a chemical reaction in the first unit cell 114. Then, the oxygen-containing gas is supplied to the second unit cell 116 through the oxygen-containing gas passage 126.

As shown in FIGS. 8 and 9, the first separator 22 has a first coolant flow passage 36a comprising a plurality of grooves on its surface facing one surface 26a of the cooling plate 26. The second separator 24 has a second coolant flow passage 38a comprising a plurality of grooves on its surface facing the other surface 26b of the cooling plate 26. Stated otherwise, the first coolant flow passage 36a is formed on one surface 26a of the cooling plate 26, and the second coolant flow passage 38a is formed on the other surface 26b of the cooling plate 26.

The first coolant flow passage 36a and the second coolant flow passage 38a extend in the longitudinal direction indicated by the arrow B. The first coolant flow passage 36a is connected to the coolant supply passage 32a at one end, and connected to a second coolant flow passage 38a at the other end. Specifically, the first coolant flow passage 36a and the second coolant flow passage 38b are connected at an end of the cooling plate 26. The second coolant flow passage 38 is connected to the coolant discharge passage 32b.

The intermediate separator 122 has substantially the same structure as the first separator 22 and the second separator 24. The intermediate separator 122 has a fuel gas flow passage (reactant gas flow passage) 40a comprising a plurality of grooves on its surface facing the anode 20a of the first membrane electrode assembly 118. The fuel gas flow passage 40a extends in the longitudinal direction indicated by the arrow B. The fuel gas flow passage 40a is connected to the fuel gas passage 124 at one end, and connected to the fuel gas discharge passage 30b at the other end.

Further, as shown in FIG. 9, the intermediate separator 122 has an oxygen-containing gas flow passage (reactant gas flow passage) 34a comprising a plurality of grooves on its surface facing the cathode 18b of the second membrane electrode assembly 120. The oxygen-containing gas flow passage 34a extends in the longitudinal direction indicated by the arrow B. The oxygen-containing gas flow passage 34a is connected to the oxygen-containing gas passage 126 at one end, and connected to the oxygen-containing gas discharge passage 28b at the other end.

An operation of the fuel cell stack 100 will be described below.

In the fuel cell stack 100, a fuel gas such as a hydrogen-containing gas, an oxygen-containing gas such as air, a coolant such as pure water, an ethylene glycol or an oil are supplied to each of the first and second unit cells 114, 116 stacked together in the direction indicated by the arrow A.

Figure 10:
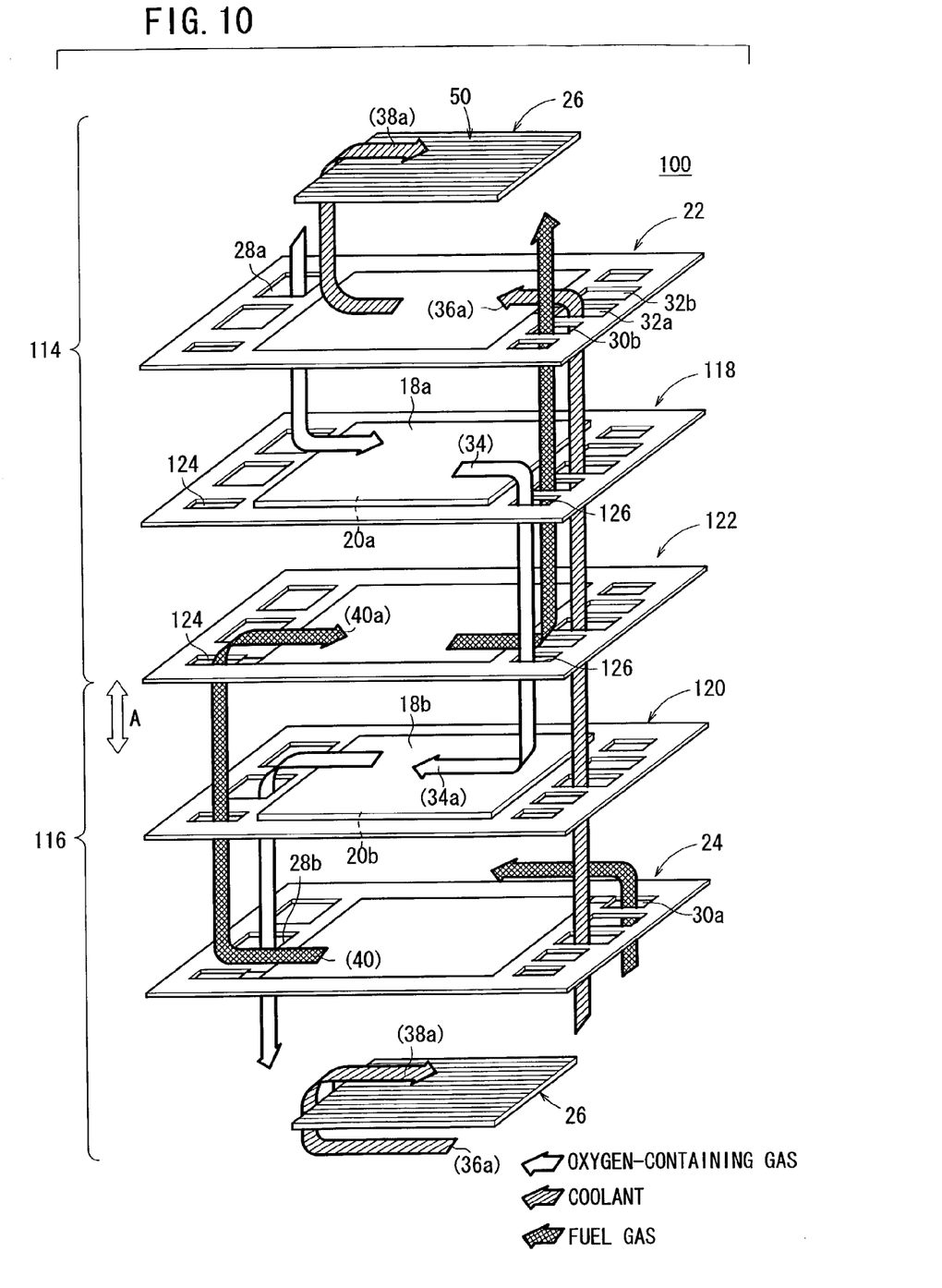
FIG. 10 is an exploded perspective view showing flows of fluids in a first unit cell and a second unit cell.

As shown in FIG. 10, the oxygen-containing gas flows through the oxygen-containing gas supply passage 28a, and flows into the grooves of the oxygen-containing gas flow passage 34 formed on the first separator 22. The oxygen-containing gas in the oxygen-containing gas flow passage 34 flows along the cathode 18a of the first membrane electrode assembly 118 to induce a chemical reaction at the cathode 18a.

The oxygen-containing gas flowing through the oxygen-containing gas flow passage 34 is partially consumed in the first membrane electrode assembly 118. Then, the oxygen-containing gas flows through the oxygen-containing gas passage 126 in the direction indicated by the arrow A, and flows into the oxygen-containing gas flow passage 34a of the intermediate separator 122. The oxygen-containing gas in the oxygen-containing gas flow passage 34a flows along the cathode 18b of the second membrane electrode assembly 120 to induce a chemical reaction at the cathode 18b, and flows into the oxygen-containing gas discharge passage 28b.

The fuel gas flows through the fuel gas supply passage 30a, and flows into the grooves of the fuel gas flow passage 40 formed on the second separator 24. The fuel gas in the fuel gas flow passage 40 flows along the anode 20b of the second membrane electrode assembly 120 to induce a chemical reaction at the anode 20b.

The fuel gas flowing through the fuel gas flow passage 40 is partially consumed at the anode 20b of the second membrane electrode assembly 120. Then, the fuel gas flows through the fuel gas passage 124 in the direction indicated by the arrow A, and flows into the fuel gas flow passage 40a of the intermediate separator 122. The fuel gas in the fuel gas flow passage 40a flows along the anode 20a of the first membrane electrode assembly 118 to induce a chemical reaction at the anode 20a, and flows into the fuel gas discharge passage 30b.

In the first and second membrane electrode assemblies 118, 120, the oxygen-containing gas supplied to the cathodes 18a, 18b, and the fuel gas supplied to the anodes 20a, 20b are consumed in the electrochemical reactions at catalyst layers of the cathodes 18a, 18b and the anodes 20a, 20b for generating electricity.

The coolant flows through the coolant supply passage 32a, and flows into the first coolant flow passage 36a of the first separator 22. The coolant turns back at a turning point, i.e., at an end of the cooing plate 26, and flows through the second coolant flow passage 38a of the second separator 24. Then, the coolant flows into the coolant discharge passage 32b.

In the second embodiment, the coolant flows through the first coolant flow passage 36a on one surface 26a of the cooling plate 26 for cooling the first unit cell 114. Then, the coolant turns back at the end of the cooling plate 26 to flow into the second coolant flow passage 38a on the other surface 26b for cooling the second unit cell 116. Therefore, the temperature of the second unit cell 116 is kept higher than the temperature of the first unit cell 114.

The oxygen-containing gas is supplied from the first unit cell 114 to the second unit cell 116 (see FIG. 10). Therefore, the amount of water vapor in the second unit cell 116 is large in comparison with the first unit cell 114. The temperature of the second unit cell 116 is kept higher than the temperature of the first unit cell 114. It is possible to prevent condensation of the water vapor, and to decrease concentration overpotential.

Further, as with the first embodiment, the cooling plate 26 has the thermal insulation mechanism 50 for preventing the heat exchange between the coolant flowing along the surface 26a, and the coolant flowing along the surface 26b. The temperature distribution is maintained desirably. Thus, it is possible to improve the power generation performance.

Figure 11:
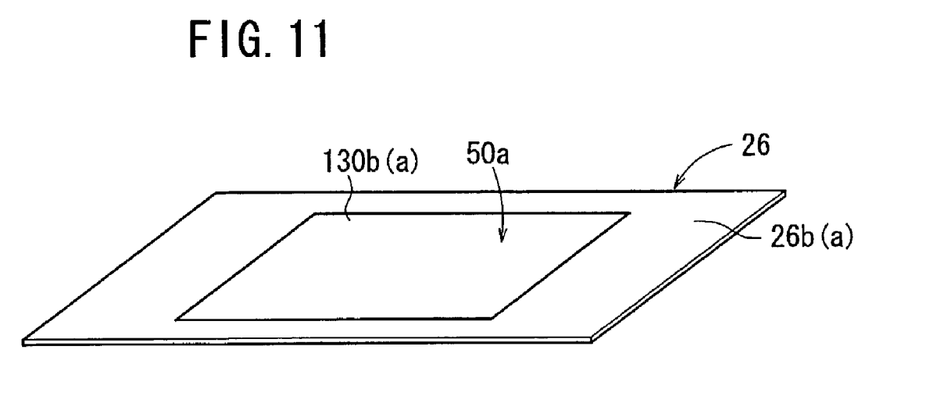
FIG. 11 is a perspective view showing a cooling plate having another type of a thermal insulation mechanism.

In the first and second embodiments, the thermal insulation mechanism 50 includes the thermal insulation layer 52a in the first coolant flow passage 36, 36a on the surface 26a of the cooling plate 26, and the thermal insulation layer 52b in the second coolant flow passage 38, 38a on the surface 26b of the cooling plate 26. Alternatively, a thermal insulation mechanism 50a as shown in FIG. 11 may be used.

The heat insulation mechanism 50a includes thermal insulation layers 130a, 130b provided centrally on both surfaces 26a, 26b of the cooling plate 26. For example, the thermal insulation layers 130a, 130b contact with the power generating surfaces of the first and second separators 22, 24 shown in FIG. 2 for preventing the heat exchange between the coolant flowing through the first coolant flow passage 36 and the coolant flowing through the second coolant flow passage 38. If the cooling plate 26 has the same size with the first and second separators 22, 24, the thermal insulation mechanism 50a is formed integrally with a sealing member into one piece. The surfaces 26a, 26b of the cooling plate 26 outside the thermal insulation layers 130a, 130b are electrically connected to the first and second separators 22, 24. Therefore, the production process is very simple.

Alternatively, the thermal insulation layer may be provided on the entire surfaces 26a, 26b of the cooling plate 26. In this case, the first separator 22 and the second separator 24 are electrically connected by a connecting mechanism provided outside the fuel cell stack.

Figure 12:
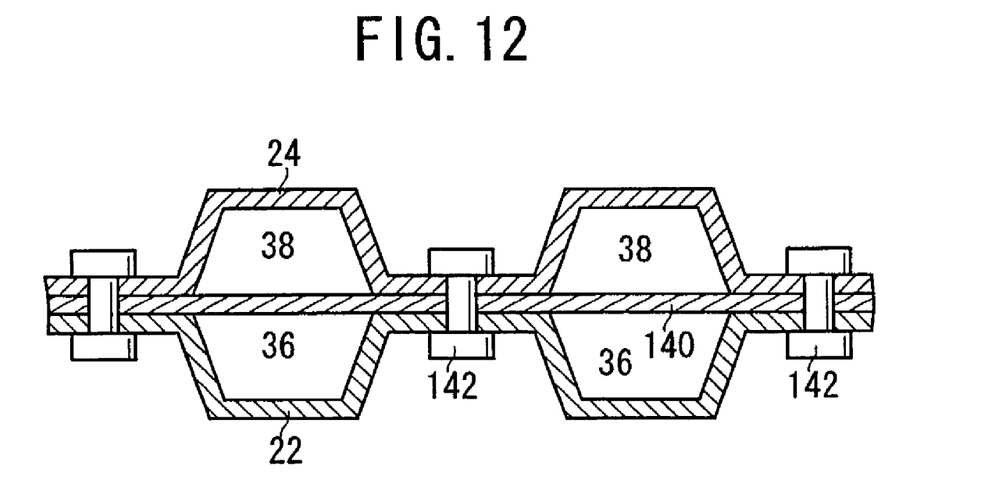
FIG. 12 is a cross sectional view showing a part of a thermal insulation cooling plate and conductive rivets.

In FIG. 12, a cooling plate 140 made of a thermal insulation material is interposed between a first separator 22 and a second separator 24. The first separator 22 and the second separator 24 are electrically connected by conductive rivets 142.

In the fuel cell stack of the present invention, the coolant flow passages are formed on both surfaces of the cooling plate adjacent to the separators. The coolant flows along one surface of the cooling plate, and turns back to flow along the other surface of the cooling plate. Firstly, the coolant cools the anode, and then, cools the cathode, for example. Thus, the temperature of the oxygen-containing gas flow passage is kept higher than the temperature of the fuel gas flow passage. Therefore, water vapor does not condense in the oxygen-containing gas flow passage. Thus, it is possible to decrease concentration overpotential in order to improve the power generation performance.

While the invention has been particularly shown and described with reference to preferred embodiments, it will be understood that variations and modifications can be effected thereto by those skilled in the art without departing from the spirit and scope of the invention as defined by the appended claims.

What is claimed is:

1. A fuel cell stack formed by stacking a plurality of assemblies each interposed between separators, each of said assemblies including a cathode, an anode, and an electrolyte interposed between said cathode and said anode, said fuel cell stack comprising:
    a cooling plate provided adjacent to at least one of said separators,
    wherein coolant flow passages are formed on both surfaces of said cooling plate such that a coolant flows along one surface of said cooling plate, and turns back to flow along the other surface of said cooling plate,
    wherein said cooling plate has a thermal insulation mechanism for preventing heat exchange between said coolant flowing along one surface of said cooling plate and said coolant flowing along the other surface of said cooling plate.

2. A fuel cell stack according to claim 1, wherein said separators include a first separator facing said cathode, and a second separator facing said anode,
    said fuel cell stack comprising a plurality of unit cells including a first unit cell and a second unit cell, each of said first unit cell and said second unit cell including said first separator, said second separator, and said assembly interposed between said first separator and said second separator,
    wherein an oxygen-containing gas flow passage is formed between said first separator and said cathode for supplying an oxygen-containing gas to said cathode;
    a fuel gas flow passage is formed between said second separator and said anode for supplying a fuel gas to said anode;
    said cooling plate is interposed between said second separator of said first unit cell and said first separator of said second unit cell; and said coolant flowing through said coolant flow passages cools said fuel gas supplied to said first unit cell, and then, cools said oxygen-containing gas supplied to said second unit cell.

3. A fuel cell stack according to claim 1, wherein said plurality of assemblies include a first assembly and a second assembly, and said separators include a first separator, a second separator, and an intermediate separator, said first assembly being interposed between said first separator and said intermediate separator to form a first unit cell, and said second assembly being interposed between said intermediate separator and said second separator to form a second unit cell, wherein each of said first unit cell and said second unit cell has an oxygen-containing gas flow passage for supplying an oxygen-containing gas to said cathode of said first unit cell, and then supplying said oxygen-containing gas to said cathode of said second unit cell; said oxygen-containing gas flow passage of said first unit cell and said oxygen-containing gas flow passage of said second unit cell are connected in series; and said coolant flowing through said coolant flow passages cools said first unit cell) and then, cools said second unit cell.

4. A fuel cell stack according to claim 3, wherein said fuel cell stack comprises a plurality of cell assemblies each including a stack of said first unit cell and said second unit cell, and said cooling plate is interposed between adjacent cell assemblies.

5. A fuel cell stack according to claim 1, wherein said thermal insulation mechanism includes resinous thermal insulation layers formed on both surfaces of said cooling plate, a connector for electrically connecting said cooling plate to said separators.

* * * * *